US012645068B2

(12) United States Patent
Iwasaki et al.

(10) Patent No.: US 12,645,068 B2
(45) Date of Patent: Jun. 2, 2026

(54) ACTUATOR

(71) Applicants:Pioneer Corporation, Tokyo (JP); Pioneer Smart Sensing Innovations Corporation, Tokyo (JP)

(72) Inventors: Shingo Iwasaki, Kawagoe (JP); Seiro Oshima, Kawagoe (JP); Tomotaka Yabe, Kawagoe (JP)

(73) Assignees: Pioneer Corporation, Tokyo (JP); Pioneer Smart Sensing Innovations Corporation, Tokyo (JP)

( * ) Notice: Subject to any disclaimer, the term of this patent is extended or adjusted under 35 U.S.C. 154(b) by 341 days.

(21) Appl. No.: 18/277,876

(22) PCT Filed: Feb. 26, 2021

(86) PCT No.: PCT/JP2021/007501
§ 371 (c)(1),
(2) Date: Aug. 18, 2023

(87) PCT Pub. No.: WO2022/180822
PCT Pub. Date: Sep. 1, 2022

(65) Prior Publication Data
US 2024/0126068 A1     Apr. 18, 2024

(51) Int. Cl.
*G02B 26/08* (2006.01)
*G02B 26/10* (2006.01)
(52) U.S. Cl.
CPC ......... *G02B 26/085* (2013.01); *G02B 26/101* (2013.01)
(58) Field of Classification Search
CPC ............................ G02B 26/085; G02B 26/101
See application file for complete search history.

(56) References Cited

U.S. PATENT DOCUMENTS 8,379,282 B2   2/2013  Shin
8,922,862 B2   12/2014  Honda et al.
(Continued)

FOREIGN PATENT DOCUMENTS

EP        3006395 B1    7/2019
JP     2000-235152 A    8/2000
(Continued)

OTHER PUBLICATIONS

Extended European Search Report received in EP 21927922.1, dated Jan. 8, 2025, in 10 pages.
(Continued)

*Primary Examiner* — Euncha P Cherry
(74) *Attorney, Agent, or Firm* — Procopio, Cory, Hargreaves & Savitch LLP

(57) ABSTRACT

A permanent magnet (21) is provided to the mirror (20). The mirror (20) can oscillate with respect to a reference plane (101), by using a first axis (201) and a second axis (202) not being parallel to the first axis (201) as oscillation axes. The first electromagnet (30) causes the mirror (20) to oscillate with respect to the first axis (201). The second electromagnet (40) causes the mirror (20) to oscillate with respect to the second axis (202). Then, at least either (A) or (B) indicated below is established in the actuator (10). (A) The first electromagnet (30) is not line-symmetric with respect to the first axis (201) as viewed from a direction perpendicular to the reference plane (101). (B) The second electromagnet (40) is not line-symmetric with respect to the second axis (202) as viewed from a direction perpendicular to the reference plane (101).

11 Claims, 17 Drawing Sheets

(56)     References Cited

U.S. PATENT DOCUMENTS

| | | | |
|---|---|---|---|
| 9,784,838 B1 * | 10/2017 | Shpunt | G01S 17/42 |
| 9,997,975 B2 | 6/2018 | Suzuki | |
| 2010/0142018 A1 | 6/2010 | Shin | |
| 2013/0063799 A1 | 3/2013 | Honda et al. | |
| 2015/0097449 A1 | 4/2015 | Suzuki | |
| 2018/0331605 A1 * | 11/2018 | Motoishi | H02K 15/0414 |
| 2021/0018601 A1 * | 1/2021 | Kitazawa | G02B 26/101 |

FOREIGN PATENT DOCUMENTS

| | | | |
|---|---|---|---|
| JP | 2004-191918 A | 7/2004 |
| JP | 2009-069676 A | 4/2009 |
| JP | 5720673 B2 | 5/2015 |
| JP | 6014234 B2 | 10/2016 |
| KR | 10-2010-0063997 A | 6/2010 |

OTHER PUBLICATIONS

Office Action dated Mar. 4, 2025 in Japanese Patent Application No. 2024-107436, 2 pages.
International Search Report (with translation) and Written Opinion received in corresponding International Application No. PCT/JP2021/007501, mailed May 18, 2021, in 8 pages.

\* cited by examiner

10

40

40

<u>40</u>

<u>40</u>

ACTUATOR

CROSS-REFERENCE TO RELATED APPLICATIONS

This application is a U.S. national stage application of International Application No. PCT/JP2021/007501, filed Feb. 26, 2021, the contents of which are incorporated by reference.

TECHNICAL FIELD

The present invention relates to an actuator.

BACKGROUND ART

In a measurement device or the like that performs measurement by scanning a predetermined area with light, a movable mirror is used to make an emission direction of light variable.

Patent Document 1 describes an optical scanning device that causes a permanent magnet fixed to a mirror and an electromagnet to interact and thereby causes driving torque to be generated in the mirror.

RELATED DOCUMENT

Patent Document

Patent Document 1: Japanese Patent Application Publication No. 2009-69676

SUMMARY OF THE INVENTION

Technical Problem

Miniaturization of an actuator driving a mirror is important for miniaturization of the whole of a measurement device or the like including the actuator. On the other hand, there has been a problem in that, when a mirror is to be driven with respect to two axes, two electromagnets are required and an actuator becomes larger in size.

A problem to be solved by the present invention includes miniaturizing an actuator that biaxially drives a mirror as one example.

Solution to Problem

The invention described in claim 1 is an actuator including:

a mirror on which a permanent magnet is provided and that can oscillate with respect to a reference plane, by using a first axis and a second axis not being parallel to the first axis as oscillation axes;

a first electromagnet that causes the mirror to oscillate with respect to the first axis; and a second electromagnet that causes the mirror to oscillate with respect to the second axis, wherein at least either (A) the first electromagnet not being line-symmetric with respect to the first axis as viewed from a direction perpendicular to the reference plane or (B) the second electromagnet not being line-symmetric with respect to the second axis as viewed from a direction perpendicular to the reference plane is established.

DESCRIPTION OF EMBODIMENTS

Hereinafter, example embodiments of the present invention will be described with reference to the drawings. Note that the same reference signs are assigned to the same constituent elements throughout the drawings, and description thereof is omitted appropriately.

First Example Embodiment

Figure 1:
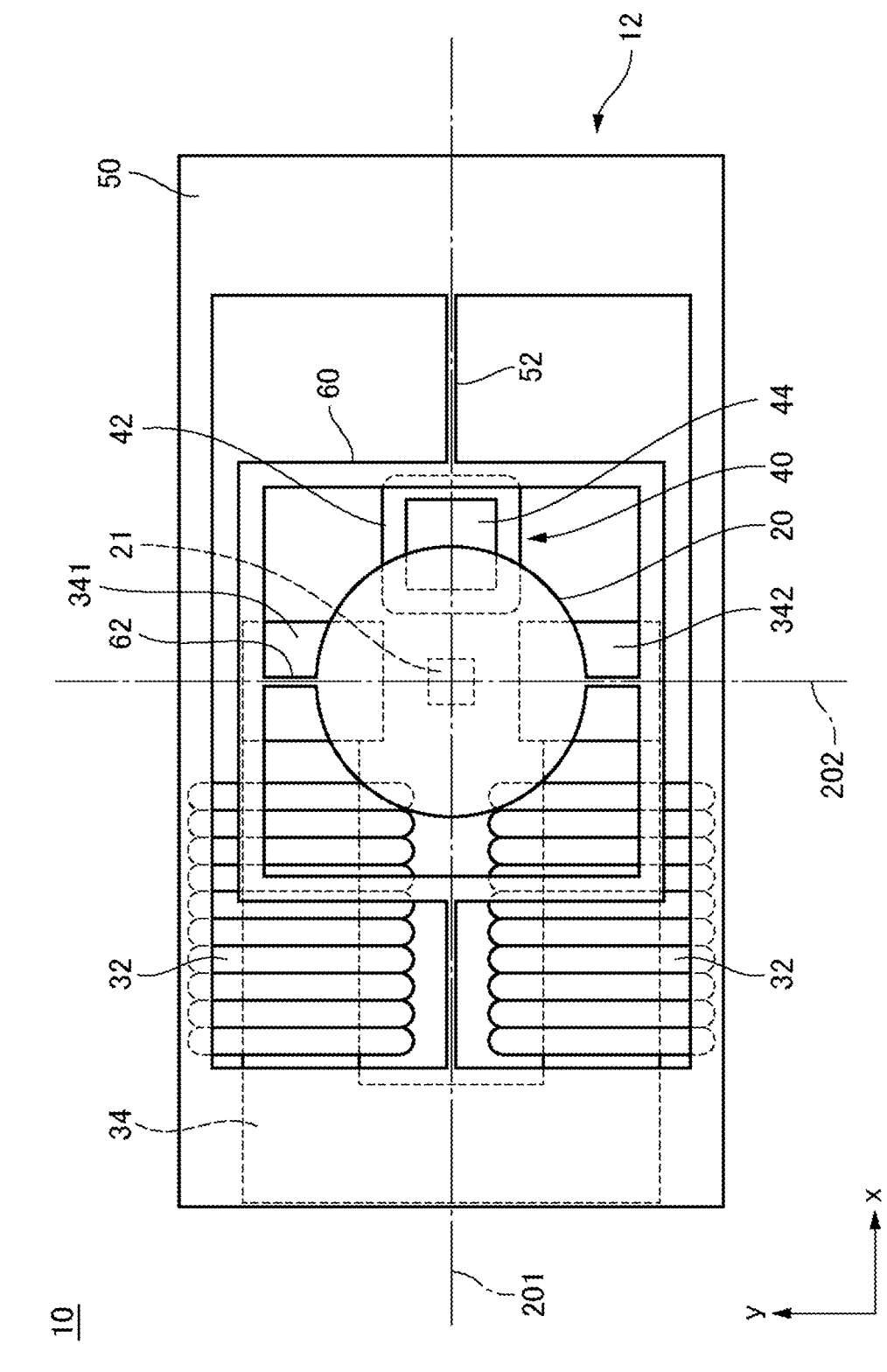
FIG. 1 is a diagram illustrating a configuration of an actuator according to a first example embodiment.
Figure 2:
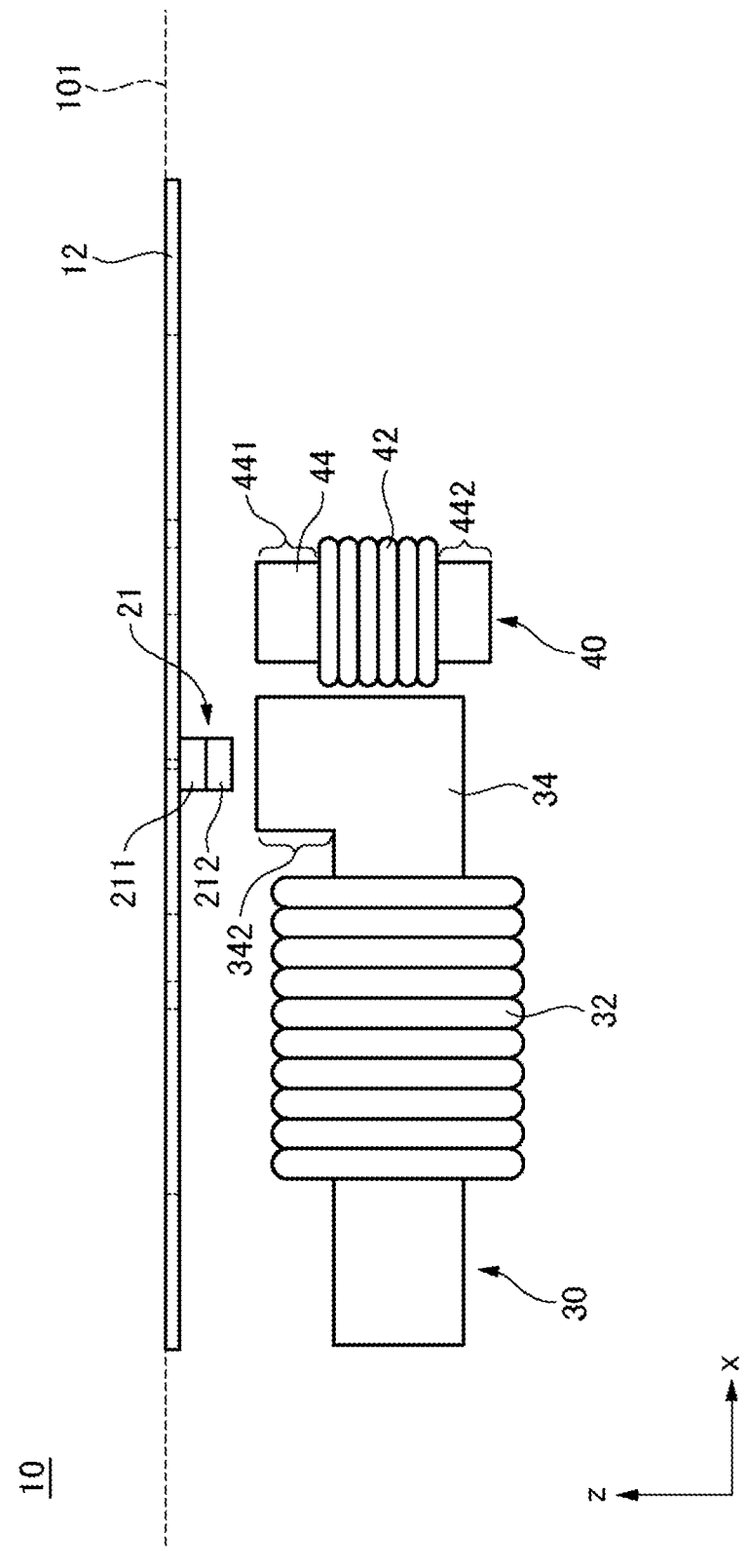
FIG. 2 is another diagram illustrating the configuration of the actuator according to the first example embodiment.
Figure 3:
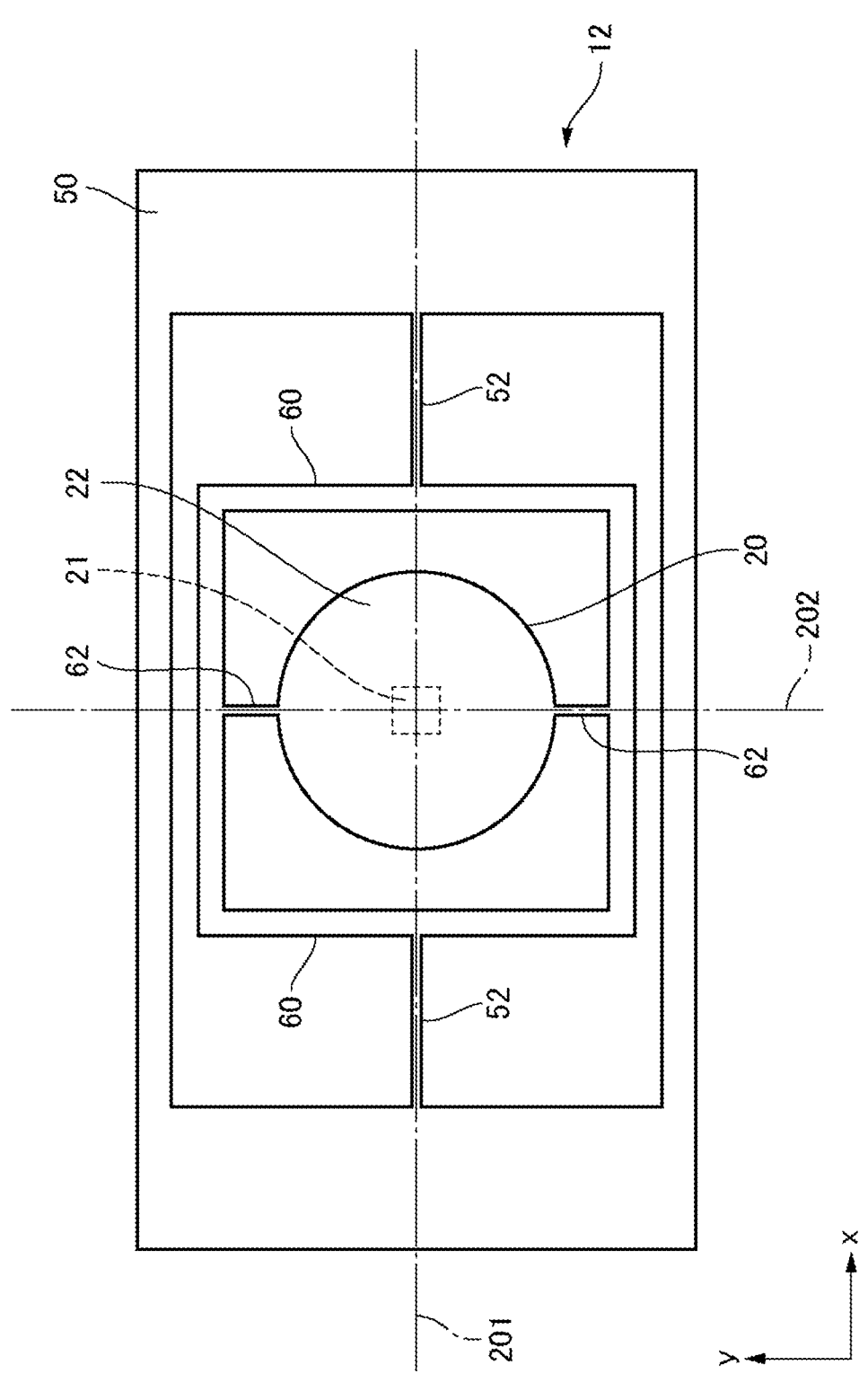
FIG. 3 is a plan view illustrating a structural body that includes a mirror, an outer side frame, and an inner side frame.
Figure 4:
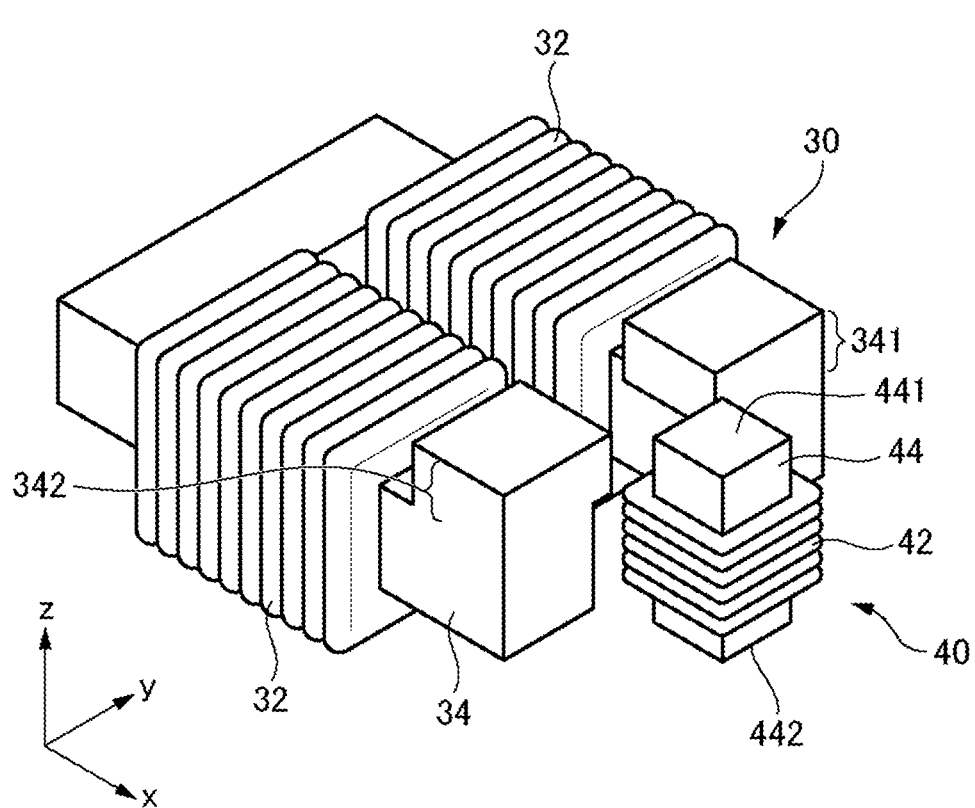
FIG. 4 is a perspective view illustrating structures of a first electromagnet and a second electromagnet.

FIGS. 1 and 2 are diagrams illustrating a configuration of an actuator 10 according to a first example embodiment. FIG. 1 is a plan view of the actuator 10, and FIG. 2 is a side view of the actuator 10. Each drawing also illustrates an x-axis, a y-axis, and a z-axis as three axes that are orthogonal to one another. In the present example embodiment, the x-axis is parallel to a first axis 201, and the y-axis is parallel to a second axis 202. In addition, FIG. 3 is a plan view illustrating a structural body 12 that includes a mirror 20, an outer side frame 50, and an inner side frame 60. FIG. 4 is a perspective view illustrating structures of a first electromagnet 30 and a second electromagnet 40.

The actuator 10 according to the present example embodiment includes the mirror 20, the first electromagnet 30, and the second electromagnet 40. A permanent magnet 21 is provided to the mirror 20. The mirror 20 can oscillate with respect to a reference plane 101, using the first axis 201 and the second axis 202 as oscillation axes. The first axis 201 and the second axis 202 are not parallel to each other. The first electromagnet 30 causes the mirror 20 to oscillate with respect to the first axis 201. The second electromagnet 40 causes the mirror 20 to oscillate with respect to the second axis 202. At least either (A) or (B) indicated below is established in the actuator 10.

(A) The first electromagnet 30 is not line-symmetric with respect to the first axis 201 as viewed from a direction perpendicular to the reference plane 101 (z-axis direction).

(B) The second electromagnet 40 is not line-symmetric with respect to the second axis 202 as viewed from the direction perpendicular to the reference plane 101.

A detailed description follows.

The mirror 20 has a reflecting surface 22, and the permanent magnet 21 is fixed to the center of a surface on the side opposite to the reflecting surface 22. A first pole 211 that is one pole of the permanent magnet 21 faces the mirror 20 side, and a second pole 212 that is the other pole of the permanent magnet 21 faces the side opposite to the mirror 20, that is, a side on which the first electromagnet 30 and the second electromagnet 40 are provided. The reference plane 101 is a plane including the reflecting surface 22 of the mirror 20 when the actuator 10 is in a state in which no current flows through coils on all the electromagnets provided to the actuator 10, that is, a reference state in which no force is exerted on the permanent magnet 21. Note that both FIGS. 1 and 2 illustrate the reference state. The reference plane 101 is parallel to the xy-plane.

The actuator 10 is a biaxial actuator and is capable of causing the mirror 20 to oscillate with respect to the first axis 201 and the second axis 202. Because of this configuration, direction of light reflected by the reflecting surface 22 of the mirror 20 can be two-dimensionally changed. In the present example embodiment, the first axis 201 and the second axis 202 are substantially perpendicular or perpendicular to each other.

On the first electromagnet 30, a coil 32 is wound around at least a portion of a yoke 34. Current flowing through the coil 32 causes magnetic flux to be generated between an end portion 341 and an end portion 342. The magnetic flux acting on the permanent magnet 21 enables the mirror 20 to be caused to oscillate with respect to the first axis 201. In addition, on the second electromagnet 40, a coil 42 is wound around at least a portion of a yoke 44. Current flowing through the coil 42 causes magnetic flux extending from a first end portion 441 and a second end portion 442 to be generated. The magnetic flux acting on the permanent magnet 21 enables the mirror 20 to be caused to oscillate with respect to the second axis 202.

As described above, at least either (A) or (B) described above is established in the actuator 10. By arranging a plurality of electromagnets in an asymmetric manner as described above, miniaturization of the actuator 10 can be achieved.

Figure 5:
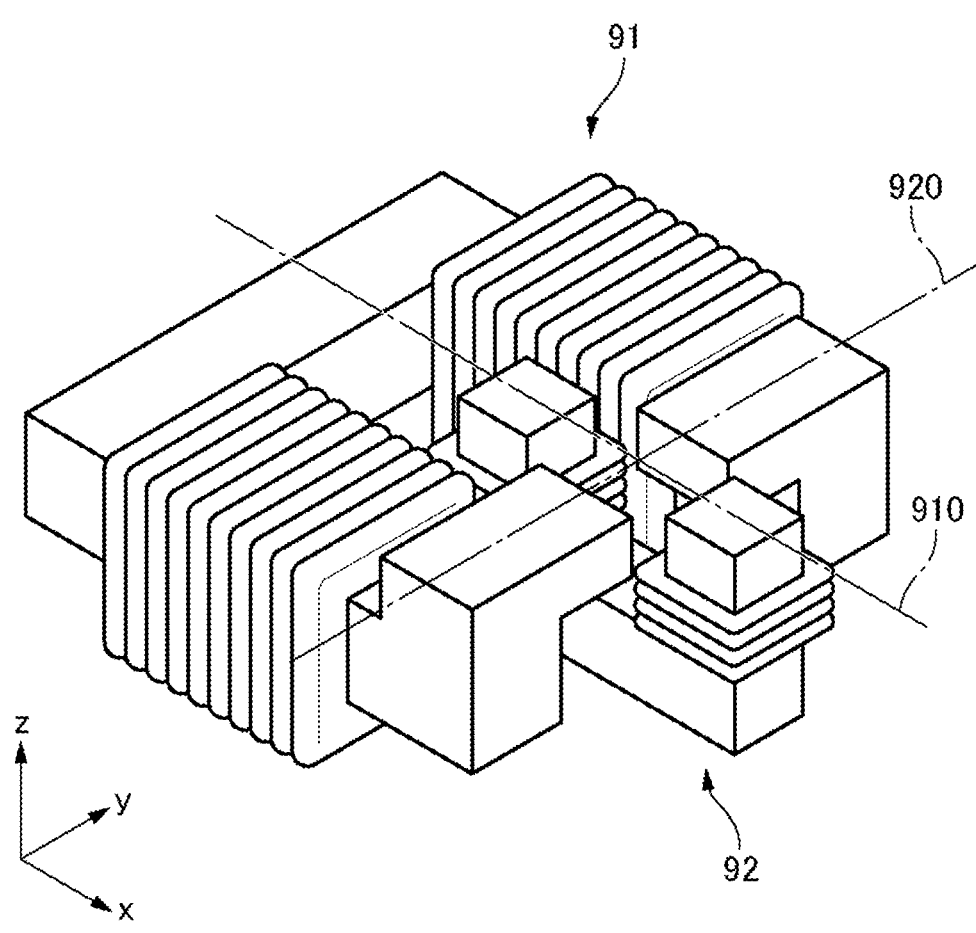
FIG. 5 is a diagram illustrating a comparative example of an arrangement of electromagnets.
Figure 6:
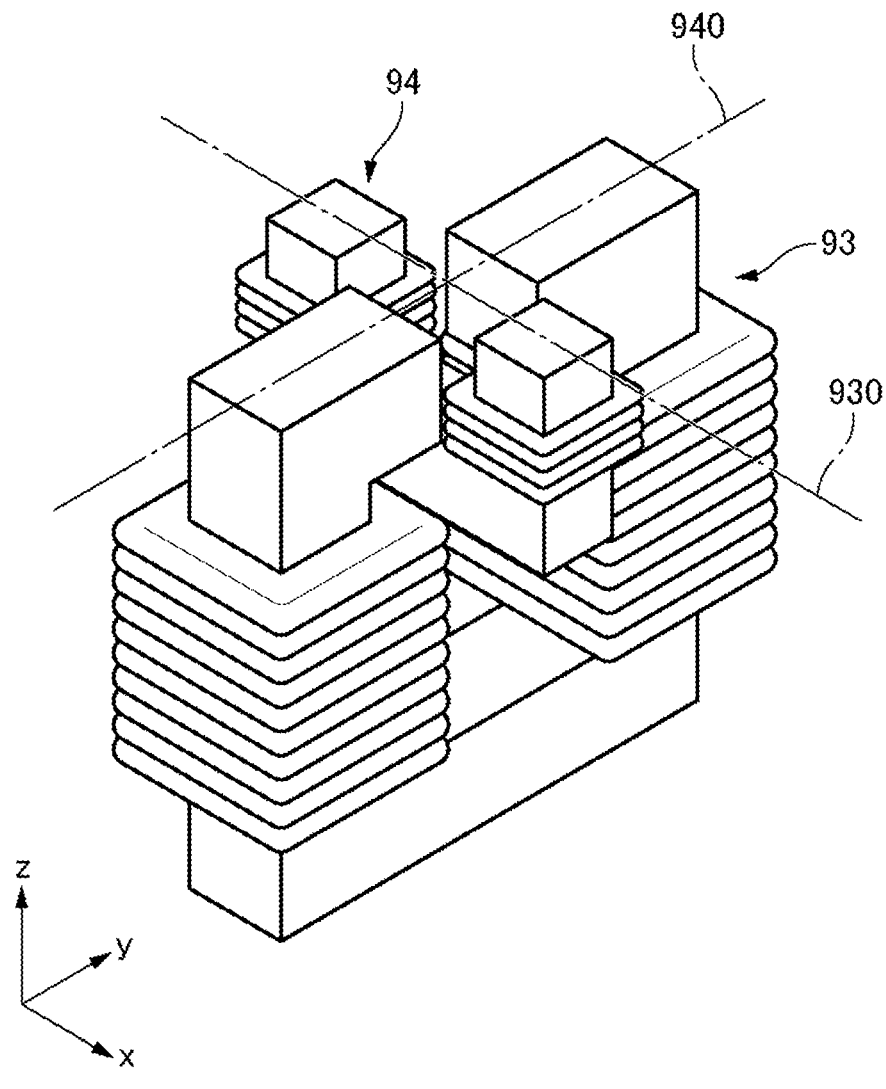
FIG. 6 is a diagram illustrating another comparative example of the arrangement of the electromagnets.

FIGS. 5 and 6 are diagrams each illustrating comparative examples of an arrangement of electromagnets. In each of FIGS. 5 and 6, two electromagnets for causing a mirror (not illustrated) to oscillate with respect to two axes are illustrated. In FIG. 5, an electromagnet 91 drives the mirror, using an axis 910 as an oscillation axis, and an electromagnet 92 drives the mirror, using an axis 920 as an oscillation axis. When the two electromagnets are viewed in the z-axis direction, the electromagnet 91 is line-symmetric with respect to the axis 910 and the electromagnet 92 is line-symmetric with respect to the axis 920. In addition, in FIG. 6, an electromagnet 93 drives the mirror, using an axis 930 as an oscillation axis, and an electromagnet 94 drives the mirror, using an axis 940 as an oscillation axis. When the two electromagnets are viewed in the z-axis direction, the electromagnet 93 is line-symmetric with respect to the axis 930 and the electromagnet 94 is line-symmetric with respect to the axis 940. In the examples, two end portions where magnetic flux is generated are provided with respect to each oscillation axis and are arranged in a symmetric manner. As a result, necessity for one electromagnet to cross over the other electromagnet occurs in order to avoid structural interference with each other. Such a structure causes the electromagnets to inevitably become larger in size as a whole.

In contrast, in the actuator 10 according to the present example embodiment, arranging a plurality of electromagnets in an asymmetric manner enables the actuator 10 to be prevented from becoming larger in size.

With reference to FIGS. 1, 2, and 4, the first electromagnet 30 and the second electromagnet 40 will be further described. In the actuator 10 according to the present example embodiment, each of the first electromagnet 30 and the second electromagnet 40 includes a coil and a yoke. Specifically, the first electromagnet 30 includes the coil 32 and the yoke 34. The second electromagnet 40 includes the coil 42 and the yoke 44. The first electromagnet 30 is U-shaped or C-shaped, and the second electromagnet 40 is I-shaped. Specifically, both ends (the end portion 341 and the end portion 342) of the yoke 34 of the first electromagnet 30 face each other with at least a portion of the permanent magnet 21 therebetween as viewed from the direction perpendicular to the reference plane 101. The yoke 44 of the second electromagnet 40 includes the first end portion 441 that is located on the reference plane 101 side and the second end portion 442 that is located on the side opposite to the reference plane 101 side with reference to the coil 42 of the second electromagnet 40 as viewed from a direction parallel to the reference plane 101. As viewed from the direction perpendicular to the reference plane 101, at least a portion of the first end portion 441 overlaps the second end portion 442. All of the end portion 341, the end portion 342, the first end portion 441, and the second end portion 442 are end portions where magnetic flux is generated.

In the example in FIG. 1, the above-described (A) is not established, and the above-described (B) is established. However, the electromagnets may have a configuration in which (B) is not established or may have a configuration in which both (A) and (B) are established.

In the present example embodiment, the first electromagnet 30 does not surround the second electromagnet 40. Specifically, as viewed from at least any direction parallel to the reference plane 101 (for example the y-axis direction), the first electromagnet 30 and the second electromagnet 40 do not overlap each other. In the present example embodiment, portions of the yoke 34 of the first electromagnet 30 around which the coil 32 is wound extend in parallel to the reference plane 101. As viewed from the direction perpendicular to the reference plane 101, the coil 32 is located on the side opposite to the second electromagnet 40 with reference to the second axis 202. In addition, the end portion 341 and the end portion 342 are closer to the mirror 20 than the coil 32 is. The yoke 44 of the second electromagnet 40 extends in the direction perpendicular to the reference plane 101, and only one of both ends of the yoke 44 faces the mirror 20. In the example in the present drawing, a cross section of a portion of the yoke 44 around which the coil 42 is wound has a square shape. The numbers of end portions where magnetic flux is generated which face the structural body 12 are different between the first electromagnet 30 and the second electromagnet 40.

Next, with reference to FIGS. 1 and 3, the structural body 12 including the mirror 20, the outer side frame 50, and the inner side frame 60 will be described. The actuator 10 further includes the outer side frame 50, torsion bars 52, the inner side frame 60, and torsion bars 62. The outer side frame 50 and the inner side frame 60 are connected via two torsion bars 52. The inner side frame 60 and the mirror 20 are connected via two torsion bars 62. The outer side frame 50, the torsion bars 52, the inner side frame 60, the torsion bars 62, and the mirror 20 are integrally formed by, for example, performing fine processing on a semiconductor wafer, and the actuator 10 is a MEMS actuator. In the present example embodiment, the whole of the first electromagnet 30 and the second electromagnet 40 is located on the one surface side of the structural body 12 including the outer side frame 50, the torsion bars 52, the inner side frame 60, the torsion bars 62, and the mirror 20.

For example, the outer side frame 50 is fixed with respect to a housing (not illustrated) of the actuator 10. The inner side frame 60 can oscillate with respect to the outer side frame 50, using the first axis 201 as an oscillation axis. The two torsion bars 52 coincide with the first axis 201. That is, the two torsion bars 52 extend along and overlap the first axis 201, and the inner side frame 60 oscillates with respect to the outer side frame 50, accompanied by torsion of the torsion bars 52. In addition, the mirror 20 can oscillate with respect to the inner side frame 60, using the second axis 202 as an oscillation axis. The two torsion bars 62 coincide with the second axis 202. That is, the two torsion bars 62 extend along and overlap the second axis 202, and the mirror 20 oscillates with respect to the inner side frame 60, accompanied by torsion of the torsion bars 62. In the above-described reference state, no torsion occurs in the torsion bars 52 or the torsion bars 62, and one surfaces of the outer side frame 50, the inner side frame 60, and the mirror 20 are in the same plane as the reference plane 101.

With reference to FIGS. 1 and 2, drive of the actuator 10 by the first electromagnet 30 will be described below. When current flows through the coil 32 of the first electromagnet 30, magnetic flux is generated between the end portion 341 and the end portion 342. On this occasion, the end portion 341 and the end portion 342 have polarities different from each other. Then, the direction of the mirror 20 changes in such a way that the permanent magnet 21 points to, of the end portion 341 and the end portion 342, an end portion that has a different polarity from the second pole 212. Changing direction and magnitude of current flowed through the coil 32 enables direction of the reflecting surface 22 of the mirror 20 to be controlled. Note that the magnetic flux may extend from not only surfaces of the end portion 341 and the end portion 342 that face each other (in the example in the present drawing, surfaces perpendicular to the y-axis) but also side surfaces (in the example in the present drawing, surfaces perpendicular to the x-axis) and upper surfaces (in the example in the present drawing, surfaces perpendicular to the z-axis) of the end portion 341 and the end portion 342. The magnetic flux described above acts on the permanent magnet 21 and thereby drives the mirror 20.

Drive of the actuator 10 by the second electromagnet 40 will be described below. As viewed from the direction perpendicular to the reference plane 101, the center of the first end portion 441 and the center of the mirror 20 do not overlap each other. That is, the first end portion 441 and the mirror 20 are shifted from each other. In the example in the present drawing, specifically, the center of the first end portion 441 is shifted from the center of the mirror 20 in a direction perpendicular to the second axis 202 (the x-axis direction). On the other hand, the center of the first end portion 441 is not shifted from the center of the mirror 20 in a direction parallel to the second axis 202 (the y-axis direction). When current flows through the coil 42 of the second electromagnet 40, magnetic flux extending from the first end portion 441 is generated. The magnetic flux from the first end portion 441 acting on the permanent magnet 21 causes the mirror 20 to oscillate with respect to the second axis 202. Specifically, when a polarity of the first end portion 441 is different from a polarity of the second pole 212, the direction of the mirror 20 changes in such a way that the permanent magnet 21 points to the first end portion 441 side. In contrast, when the polarity of the first end portion 441 is the same as the polarity of the second pole 212, the direction of the mirror 20 changes in such a way that the permanent magnet 21 points in a direction in which the permanent magnet 21 separates from the first end portion 441. Changing the direction and magnitude of current flowed through the coil 42 enables the direction of the reflecting surface 22 of the mirror 20 to be controlled. Note that the magnetic flux may extend from an upper surface of the first end portion 441 (in the example in the present drawing, a surface perpendicular to the z-axis), an undersurface of the second end portion 442 (in the example in the present drawing, a surface perpendicular to the z-axis), and side surfaces of the first end portion 441 and the second end portion 442 (in the example in the present drawing, surfaces perpendicular to the y-axis or the x-axis). The magnetic flux described above acts on the permanent magnet 21 and thereby drives the mirror 20.

Performing the above-described drive by the first electromagnet 30 and the second electromagnet 40 at the same time enables the reflecting surface 22 to be caused to face in a desirable direction.

In the present example embodiment, the second electromagnet 40 drives the mirror 20 in such a way that the mirror 20 oscillates at a resonant frequency. Driving force is likely to be smaller in the case of driving by pointing only one end portion where magnetic flux is generated to the permanent magnet 21 side like the case of the second electromagnet 40 than in the case of driving by pointing two end portions where magnetic flux is generated to the permanent magnet 21 like the case of the first electromagnet 30. In contrast, driving the mirror 20 in such a way that the mirror 20 oscillates at a resonant frequency enables the mirror 20 to be sufficiently driven even with a small force.

Figure 7:
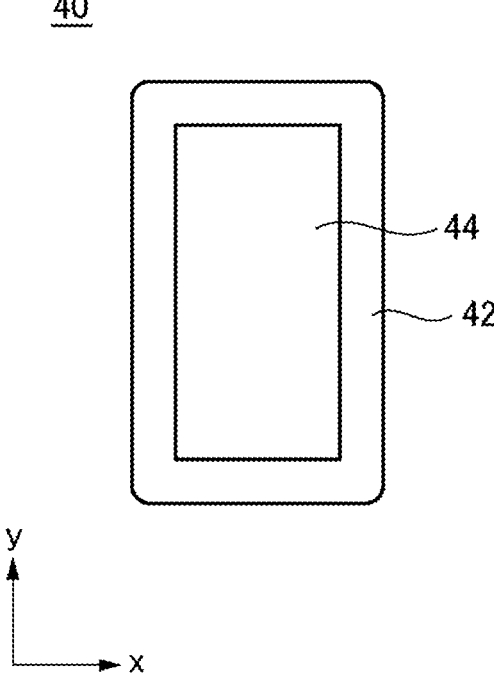
FIG. 7 is a diagram illustrating a variation of a cross-sectional shape of a yoke of the second electromagnet.

FIG. 7 is a diagram illustrating a variation of a cross-sectional shape of a yoke of the second electromagnet 40. In the example of the present drawing, a cross section of a portion of the yoke 44 around which the coil 42 is wound in the second electromagnet 40 has a rectangular shape. By employing such a configuration, it is possible to increase cross-sectional area of the yoke and increase magnetic force that the second electromagnet 40 generates. As a result, it is possible to sufficiently drive the mirror 20 even when the mirror 20 is driven by pointing only one end portion where magnetic flux is generated to the permanent magnet 21 side.

Figure 8:
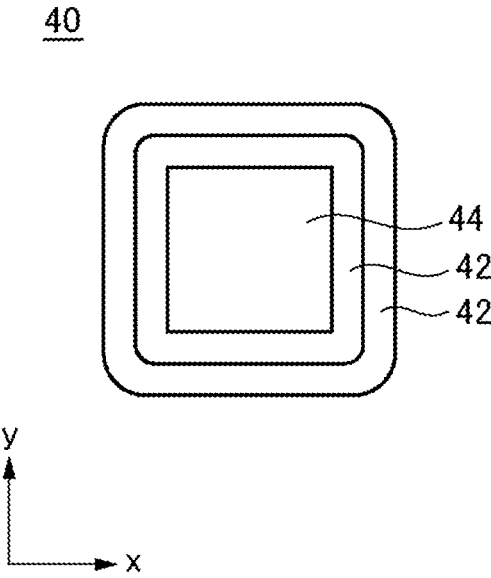
FIG. 8 is a diagram illustrating a variation of a winding method of a coil.

FIG. 8 is a diagram illustrating a variation of a winding method of the coil 42. In the example of the present drawing, the coils 42 is wound around the yoke 44 in a lap winding manner in the second electromagnet 40. By employing such a configuration, it is possible to increase magnetic force that the second electromagnet 40 generates. As a result, it is possible to sufficiently drive the mirror 20 even when the mirror 20 is driven by pointing only one end portion where magnetic flux is generated to the permanent magnet 21 side.

According to the present example embodiment described above, at least either (A) or (B) described above is established. By employing such a configuration, a degree of freedom in arrangement of two electromagnets in design increases, and the actuator 10 can be miniaturized.

Second Example Embodiment

Figure 9:
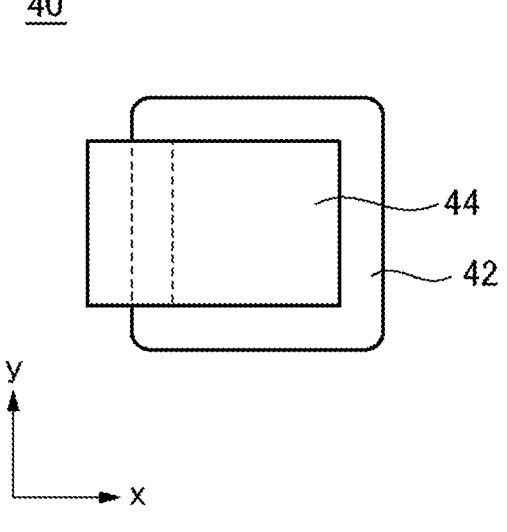
FIG. 9 is a diagram illustrating a shape of a second electromagnet according to a second example embodiment.
Figure 9:
Figure 9:
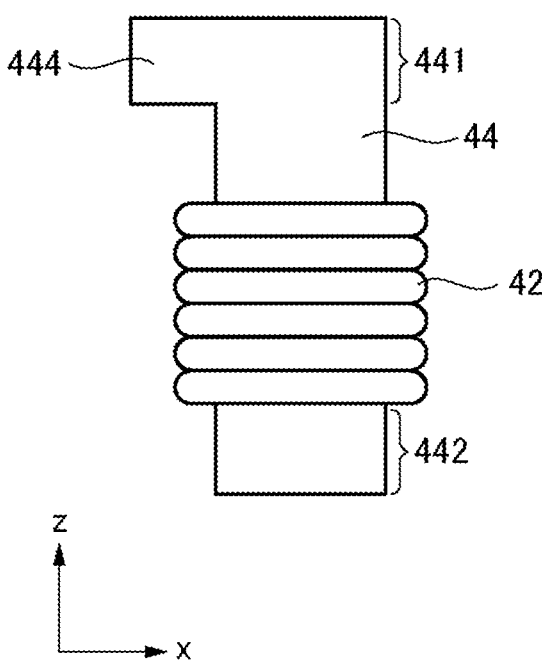

FIG. 9 is a diagram illustrating a shape of a second electromagnet 40 according to a second example embodiment. An actuator 10 according to the present example embodiment is the same as the actuator 10 according to the first example embodiment except the shape of the second electromagnet 40, which will be described below. In each of FIGS. 9 to 16, which will be described below, a plan view and a side view of the second electromagnet 40 are illustrated in the upper part and the lower part of the drawing, respectively.

In the present example embodiment, a projecting portion 444 that projects to the permanent magnet 21 side as viewed from a direction perpendicular to a reference plane 101 is formed on at least one of a first end portion 441 and a second end portion 442. The projecting portion 444 being formed causes an end portion, where magnetic flux is generated, of a yoke 44 and the permanent magnet 21 to come closer to each other and enables driving force exerted on a mirror 20 to be increased. In addition, when a coil 42 is wound in a lap winding manner, a portion around which the coil 42 is wound becomes thick and it becomes necessary to set the central axis of the yoke 44 farther apart from the permanent magnet 21. Even in such a case, forming the projecting portion 444 enables magnetic flux to sufficiently act on the permanent magnet 21.

In the example in FIG. 9, the projecting portion 444 is formed only on the first end portion 441. Forming the projecting portion 444 on the first end portion 441 enables driving force to be increased more effectively. In addition, not forming the projecting portion 444 on the second end portion 442 enables miniaturization and weight reduction of the actuator 10 to be achieved more easily than in the case of forming the projecting portion 444 on the second end portion 442.

FIGS. 10 to 16 are diagrams each illustrating variations of the shape of the second electromagnet 40 according to the present example embodiment. The variations will be described below in order.

Figure 10:
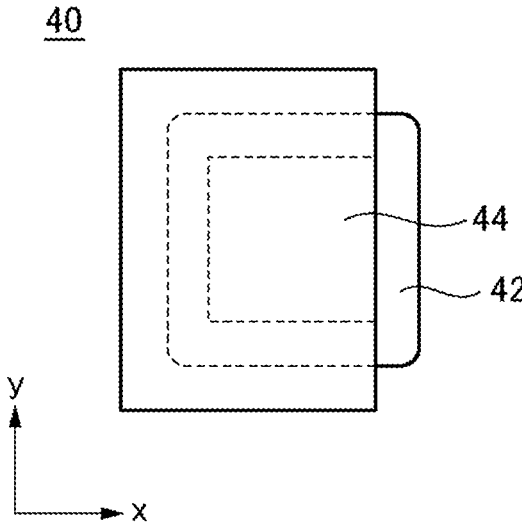
FIG. 10 is a diagram illustrating a variation of the shape of the second electromagnet according to the second example embodiment.
Figure 10:
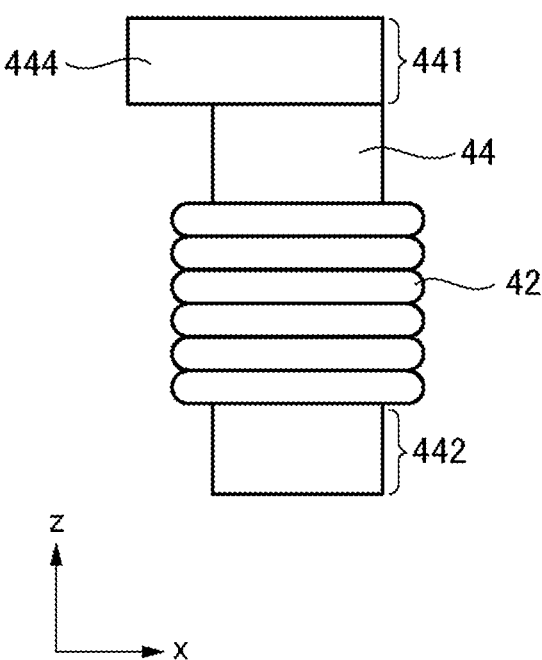
Figure 11:
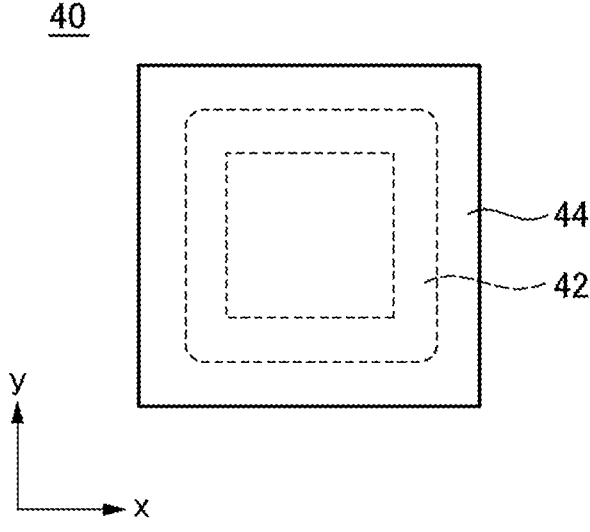
FIG. 11 is a diagram illustrating another variation of the shape of the second electromagnet according to the second example embodiment.
Figure 11:
Figure 11:
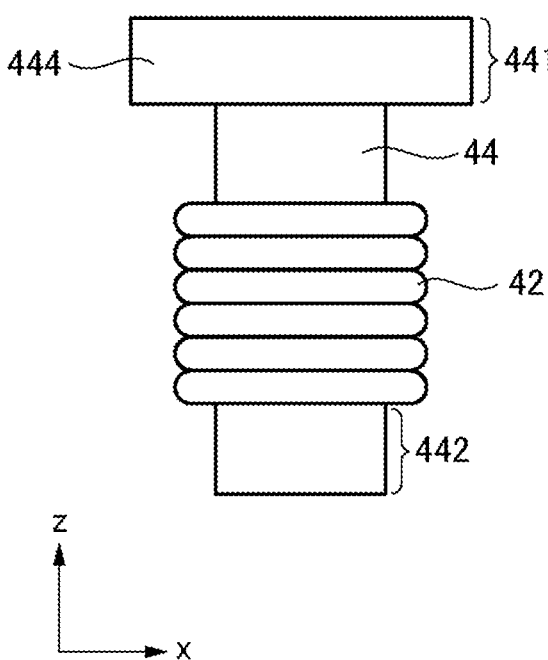

In an example in FIG. 10, a projecting portion 444 projects not only to the permanent magnet 21 side but also in a y-axis direction. In addition, in an example in FIG. 11, a projecting portion 444 further projects to the side opposite to the permanent magnet 21 side. Enlarging the projecting portion 444 enables driving force to be further increased.

Figure 12:
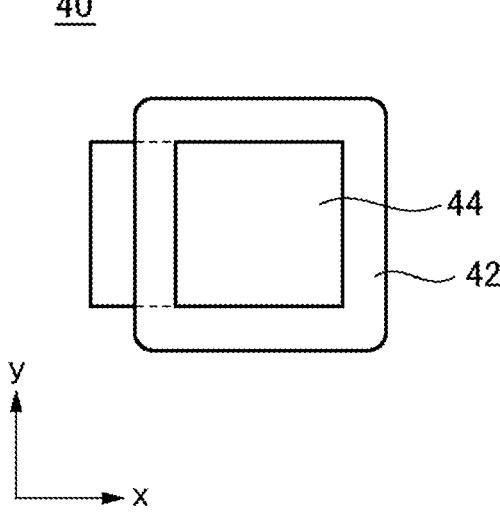
FIG. 12 is a diagram illustrating still another variation of the shape of the second electromagnet according to the second example embodiment.
Figure 12:
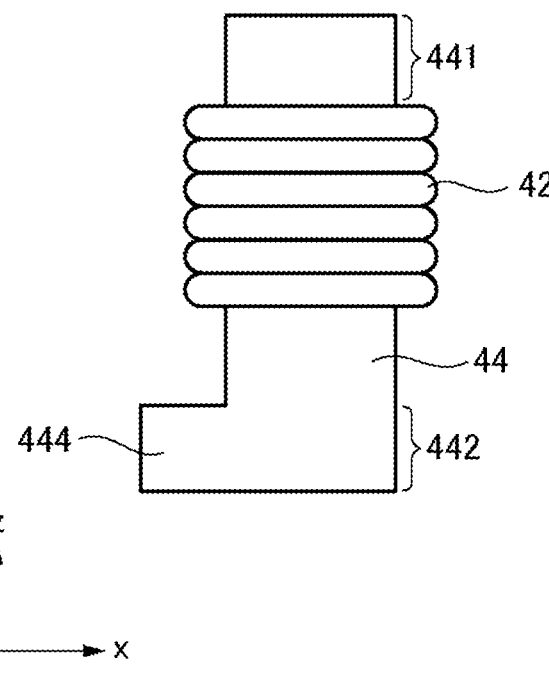
Figure 13:
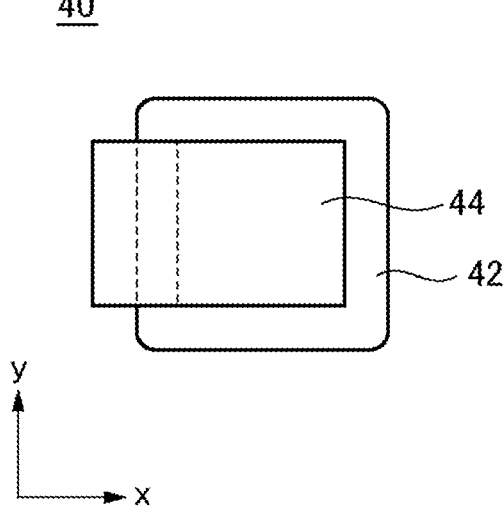
FIG. 13 is a diagram illustrating still another variation of the shape of the second electromagnet according to the second example embodiment.
Figure 13:
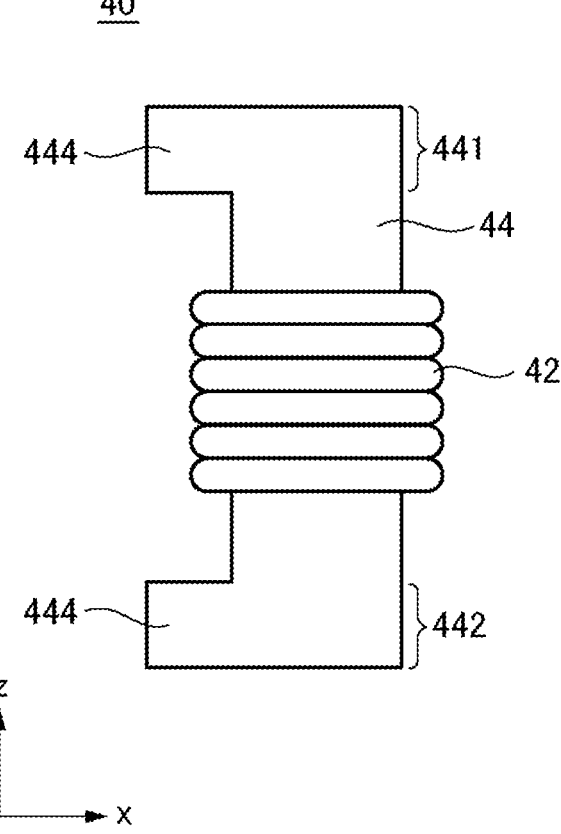
Figure 14:
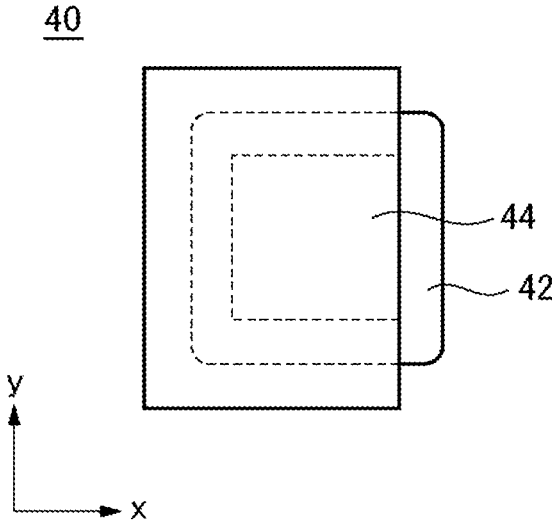
FIG. 14 is a diagram illustrating still another variation of the shape of the second electromagnet according to the second example embodiment.
Figure 14:
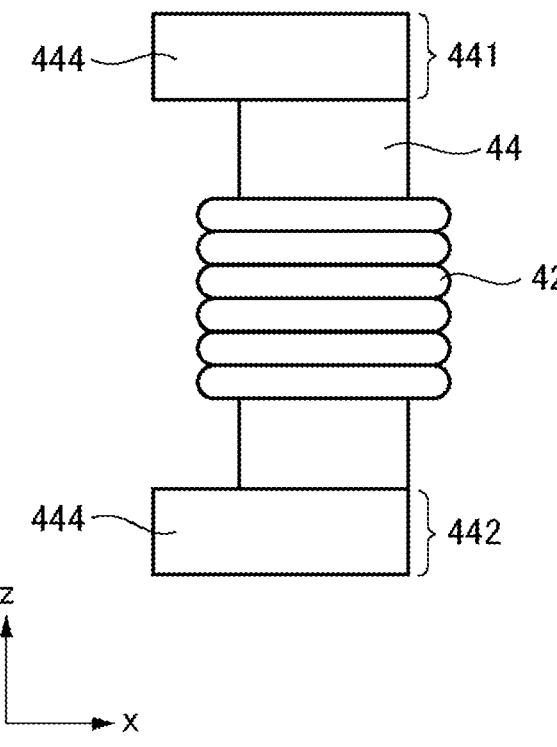
Figure 15:
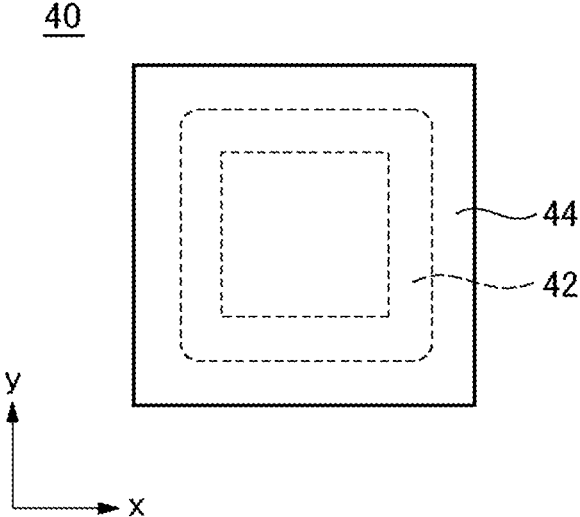
FIG. 15 is a diagram illustrating still another variation of the shape of the second electromagnet according to the second example embodiment.
Figure 15:
Figure 15:
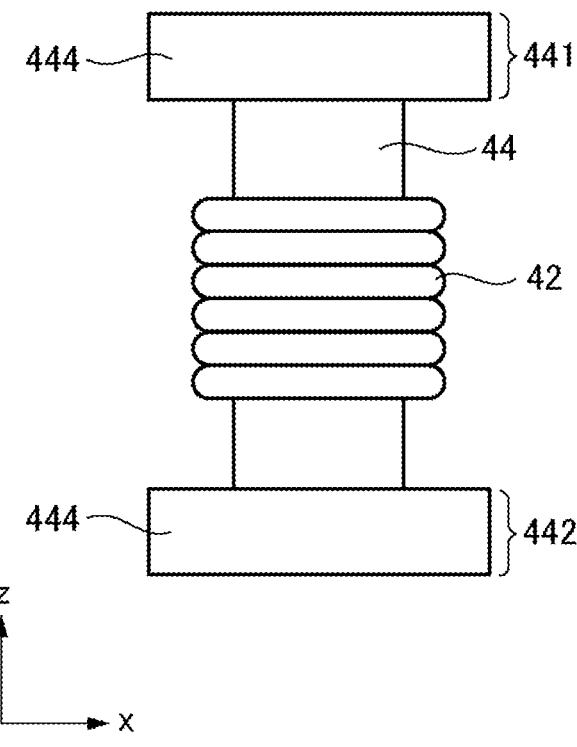
Figure 16:
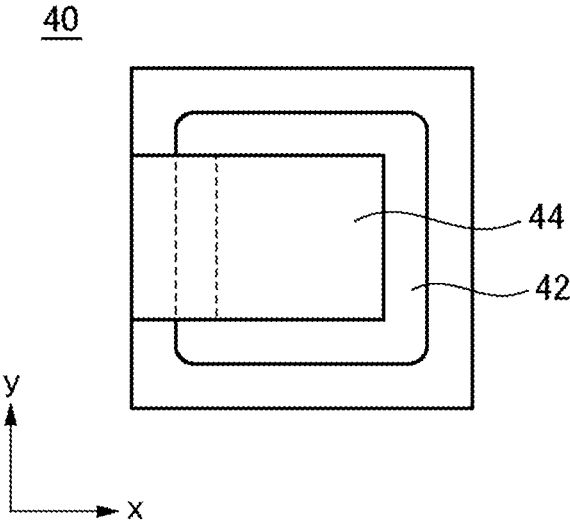
FIG. 16 is a diagram illustrating still another variation of the shape of the second electromagnet according to the second example embodiment.
Figure 16:
Figure 16:
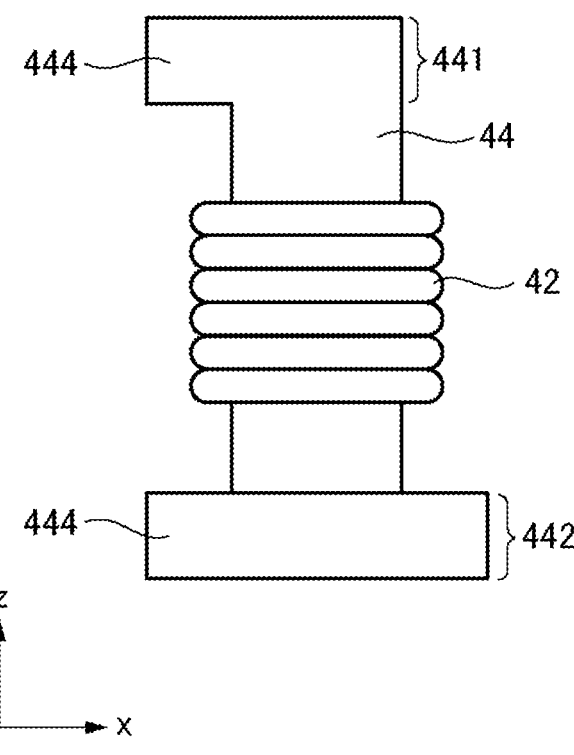

In an example in FIG. 12, a projecting portion 444 is formed only on the second end portion 442. Even such a configuration enables driving force exerted on the mirror 20 by the second electromagnet 40 to be increased. Note that the shape of the projecting portion 444 on the second end portion 442 side is not limited to a specific shape and may be a shape like the shape in FIG. 10 or 11.

In examples in FIGS. 13 to 16, projecting portions 444 are formed on both the first end portion 441 and the second end portion 442. By employing such a configuration, it is possible to increase driving force more than in the case where a projecting portion 444 is formed on either the first end portion 441 or the second end portion 442. In the examples in FIGS. 13 to 15, the projecting portion 444 on the first end portion 441 side and the projecting portion 444 on the second end portion 442 side have the same shape. In the example in FIG. 16, the projecting portion 444 on the first end portion 441 side and the projecting portion 444 on the second end portion 442 side have different shapes.

According to the present example embodiment described above, effects and advantages similar to those in the first example embodiment can be achieved. In addition, a projecting portion 444 that projects to the permanent magnet 21 side as viewed from the direction perpendicular to the reference plane 101 is formed on at least one of the first end portion 441 and the second end portion 442. By employing such a configuration, it is possible to cause magnetic flux of the second electromagnet 40 to act on the permanent magnet 21 more strongly and increase driving force exerted on the mirror 20.

Third Example Embodiment

Figure 17:
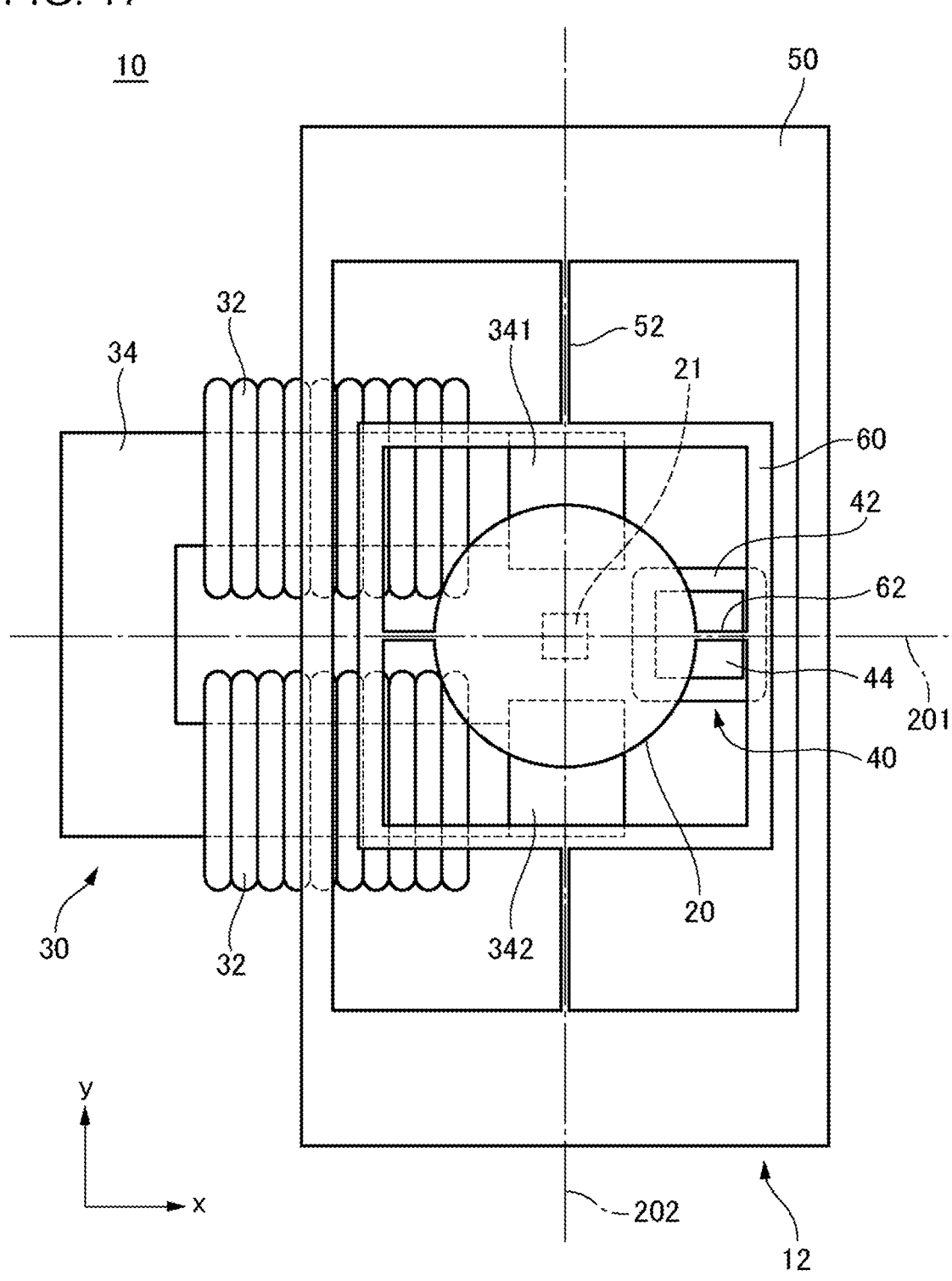
FIG. 17 is a diagram illustrating a configuration of an actuator according to a third example embodiment.

FIG. 17 is a diagram illustrating a configuration of an actuator 10 according to a third example embodiment. The actuator 10 according to the present example embodiment is the same as the actuator 10 according to at least either the first example embodiment or the second example embodiment except that a first electromagnet 30 drives a mirror 20 in such a way that the mirror 20 oscillates at a resonant frequency.

In the present example embodiment, an inner side frame 60 can oscillate with respect to an outer side frame 50, using a second axis 202 as an oscillation axis. Two torsion bars 52 coincide with the second axis 202. That is, the two torsion bars 52 extend along and overlap the second axis 202, and the inner side frame 60 oscillates with respect to the outer side frame 50, accompanied by torsion of the torsion bars 52. In addition, the mirror 20 can oscillate with respect to the inner side frame 60, using a first axis 201 as an oscillation axis. Two torsion bars 62 coincide with the first axis 201. That is, the two torsion bars 62 extend along and overlap the first axis 201, and the mirror 20 oscillates with respect to the inner side frame 60, accompanied by torsion of the torsion bars 62.

According to the present example embodiment described above, effects and advantages similar to those in the first example embodiment can be achieved.

Fourth Example Embodiment

Figure 18:
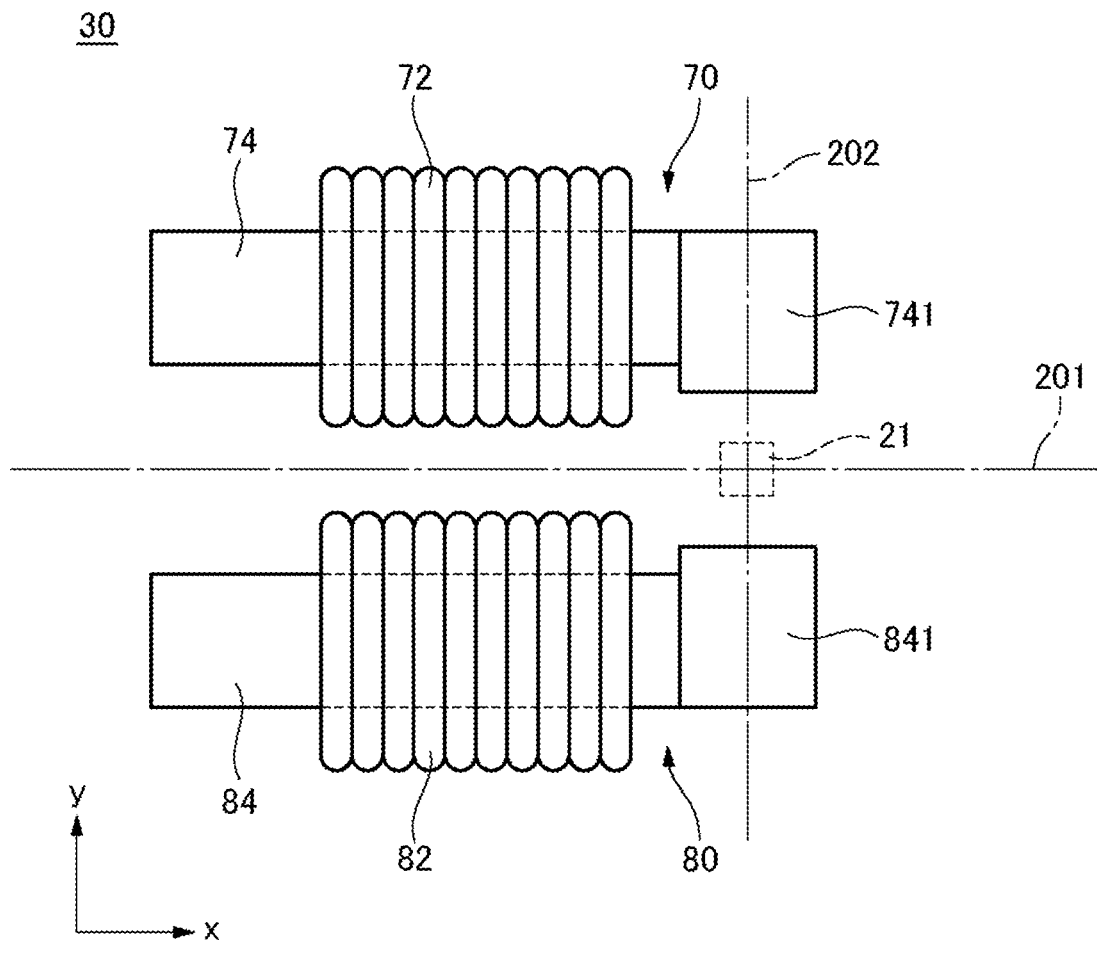
FIG. 18 is a diagram illustrating a structure of a first electromagnet according to a fourth example embodiment.

FIG. 18 is a diagram illustrating a structure of a first electromagnet 30 according to the present example embodiment. An actuator 10 according to the present example embodiment is the same as the actuator 10 according to at least one of the first to third example embodiments except a feature that will be described below. In the present drawing, a permanent magnet 21 is illustrated by a dashed line.

In the present example embodiment, the first electromagnet 30 is composed of two electromagnets, namely an electromagnet 70 and an electromagnet 80. In other words, a yoke 34 of the first electromagnet 30 is separated into two portions. The first electromagnet 30 is line-symmetric with respect to a first axis 201 as a whole. The electromagnet 70 and the electromagnet 80 each extend in parallel to the first axis 201 as viewed from a direction perpendicular to a reference plane 101. The first electromagnet 30 does not overlap the first axis 201 as viewed from the direction perpendicular to the reference plane 101.

The electromagnet 70 includes a coil 72 and a yoke 74, and the electromagnet 80 includes a coil 82 and a yoke 84. The coil 72 is wound around at least a portion of the yoke 74. The coil 82 is wound around at least a portion of the yoke 84. In the configuration according to the present example embodiment, the first electromagnet 30 also functions in a similar manner to the first electromagnet 30 according to the first example embodiment. Specifically, an end portion 741 and an end portion 841 face each other and form a pair. The end portion 741 of the electromagnet 70 functions as the end portion 341 that was described in the first example embodiment, and the end portion 841 of the electromagnet 80 functions as the end portion 342 that was described in the first example embodiment.

According to the present example embodiment described above, effects and advantages similar to those in the first example embodiment can be achieved. In addition, the yoke 34 of the first electromagnet 30 is separated into two portions. By employing such a configuration, a degree of freedom in arrangement of two electromagnets in design further increases, and the actuator 10 can be further miniaturized.

Although the example embodiments have been described above with reference to the drawings, these are examples of the present invention, and various configurations other than the above can be adopted. For example, the actuator 10 may further include, in addition to the constituent elements illustrated in the drawings, a portion supporting each constituent element, wiring, a control unit, and the like. In addition, the shapes of the mirror 20, the first electromagnet 30, the second electromagnet 40, the structural body 12, and the like are not limited to examples in the present example embodiment.

REFERENCE SIGNS LIST

10 Actuator
12 Structural body
20 Mirror
21 Permanent magnet
22 Reflecting surface
30 First electromagnet
32 Coil
34 Yoke
40 Second electromagnet
42 Coil
44 Yoke
50 Outer side frame
52 Torsion bar
60 Inner side frame
62 Torsion bar
70 Electromagnet
72 Coil
74 Yoke
80 Electromagnet
82 Coil
84 Yoke
101 Reference plane
201 First axis
202 Second axis
211 First pole
212 Second pole
341 End portion
342 End portion
441 First end portion
442 Second end portion
444 Projecting portion

The invention claimed is:

1. An actuator comprising:
a mirror on which a permanent magnet is provided and that oscillates with respect to a reference plane, by using a first axis and a second axis not being parallel to the first axis as oscillation axes;
a first electromagnet that causes the mirror to oscillate with respect to the first axis; and
a second electromagnet that causes the mirror to oscillate with respect to the second axis, wherein
at least either (A) the first electromagnet not being line-symmetric with respect to the first axis as viewed from a direction perpendicular to the reference plane, or (B) the second electromagnet not being line-symmetric with respect to the second axis as viewed from a direction perpendicular to the reference plane is established, and
the second electromagnet is I-shaped.

2. The actuator according to claim 1, wherein
each of the first electromagnet and the second electromagnet comprises a coil and a yoke,
both ends of the yoke of the first electromagnet face each other with at least a portion of the permanent magnet therebetween as viewed from a direction perpendicular to the reference plane, and
the yoke of the second electromagnet includes a first end portion being located on a reference plane side and a second end portion being located on a side opposite to the reference plane side with reference to the coil of the second electromagnet as viewed from a direction parallel to the reference plane.

3. The actuator according to claim 2, wherein
the second electromagnet drives the mirror in such a way that the mirror oscillates at a resonant frequency.

4. The actuator according to claim 2, wherein,
as viewed from a direction perpendicular to the reference plane, a center of the first end portion of the yoke of the second electromagnet and a center of the mirror do not overlap each other.

5. The actuator according to claim 2, wherein
a projecting portion that projects to the permanent magnet side as viewed from a direction perpendicular to the reference plane is provided on at least one of the first end portion and the second end portion of the yoke of the second electromagnet.

6. The actuator according to claim 2, wherein
a cross section of a portion of the yoke around which the coil is wound in the second electromagnet has a rectangular shape.

7. The actuator according to claim 2, wherein
the coil is wound in a lap winding manner in the second electromagnet.

8. The actuator according to claim 2, wherein
portions of the yoke of the first electromagnet around, which the coil is wound, extend in parallel to the reference plane.

9. The actuator according to claim 2, wherein
only one of both ends of the yoke of the second electromagnet faces the mirror.

10. The actuator according to claim 1, wherein
an entirety of the first electromagnet and the second electromagnet is located on one surface side of a structural body including an outer side frame, torsion bars, an inner side frame, and the mirror.

11. The actuator according to claim 2, wherein a center of the first end portion is shifted from a center of the mirror in a direction perpendicular to the second axis, and the center of the first end portion of the yoke of the second electromagnet is not shifted from the center of the mirror in a direction parallel to the second axis.

\* \* \* \* \*